Jan. 6, 1970      T. H. BUSH ET AL      3,487,500
APPARATUS FOR LINKING SAUSAGE STRANDS
Filed Aug. 3, 1967      5 Sheets-Sheet 5

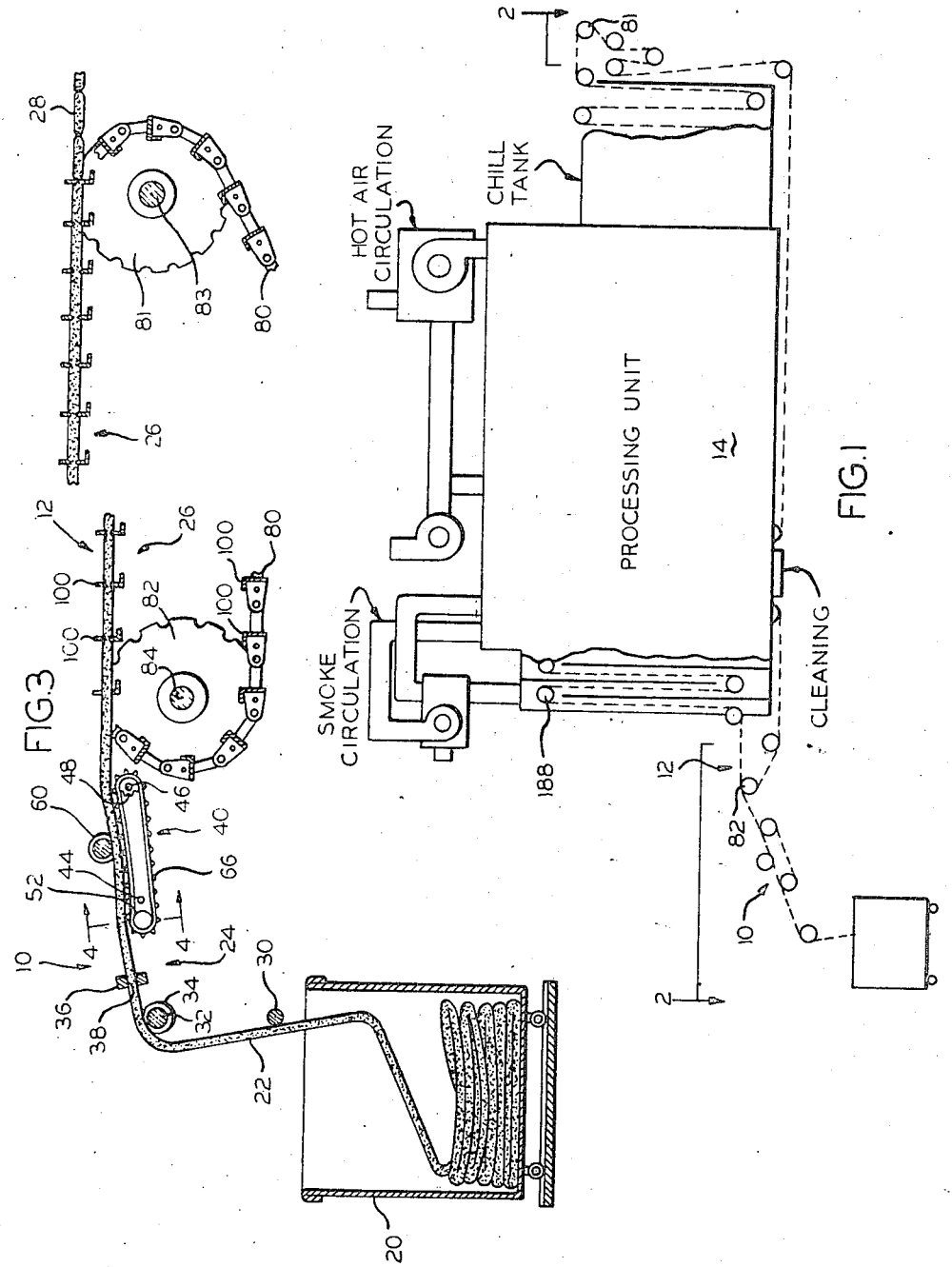

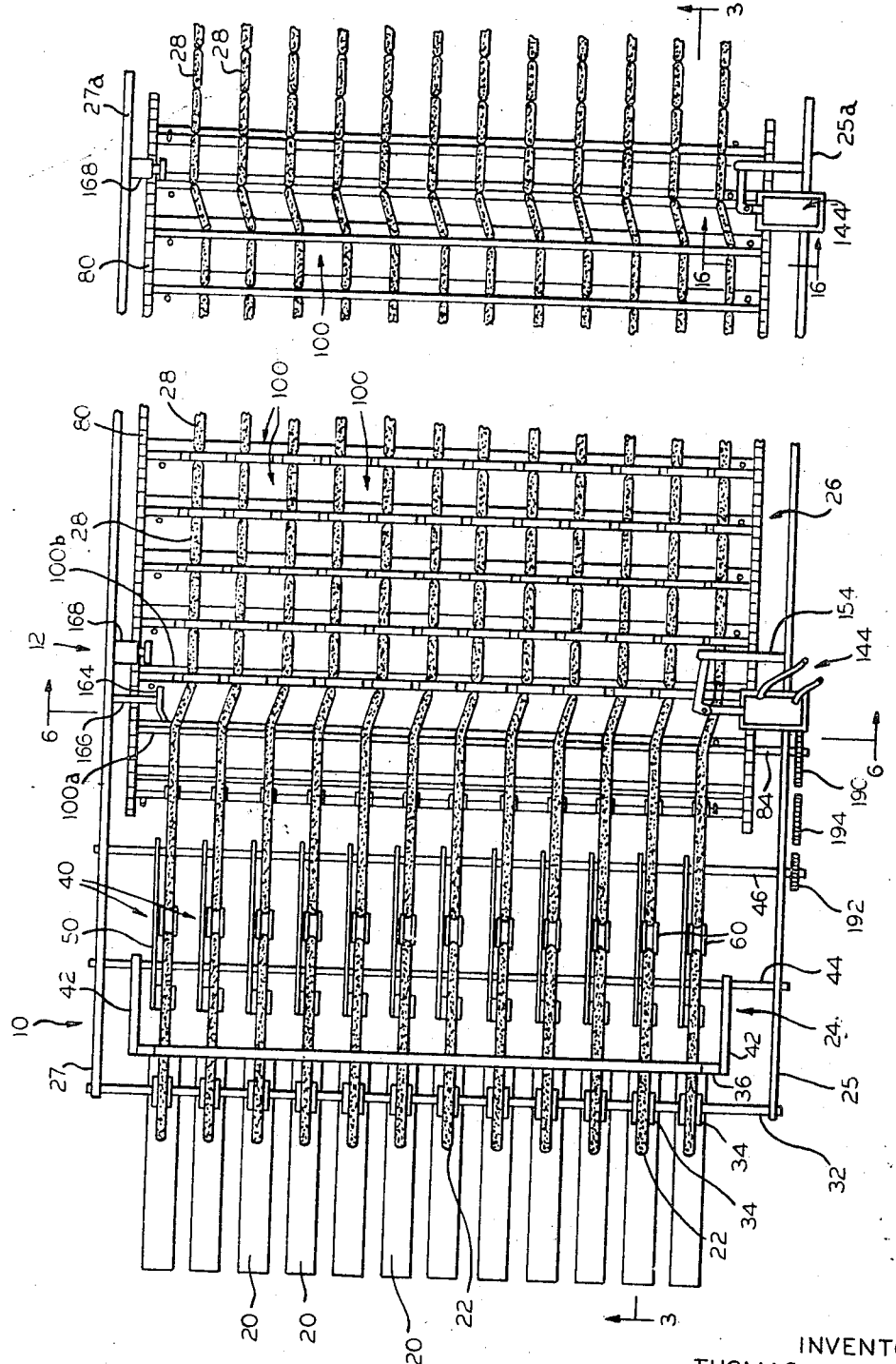

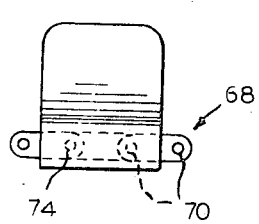
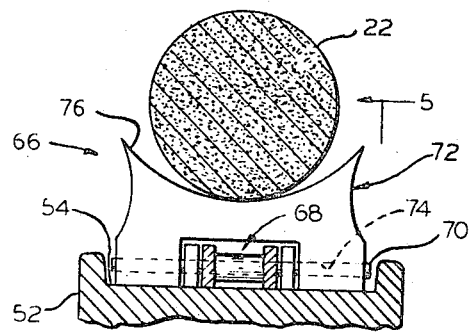
FIG.5  FIG.4
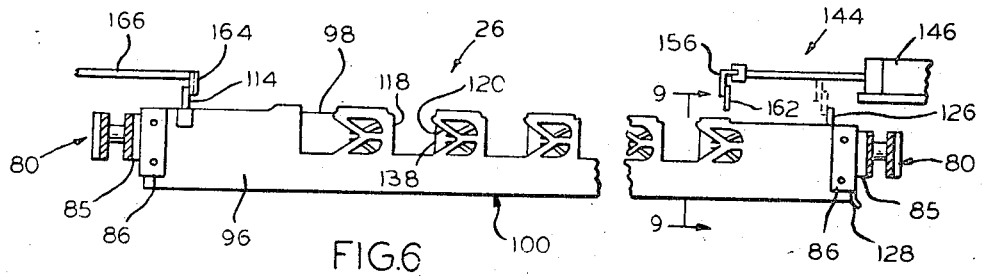
FIG.6
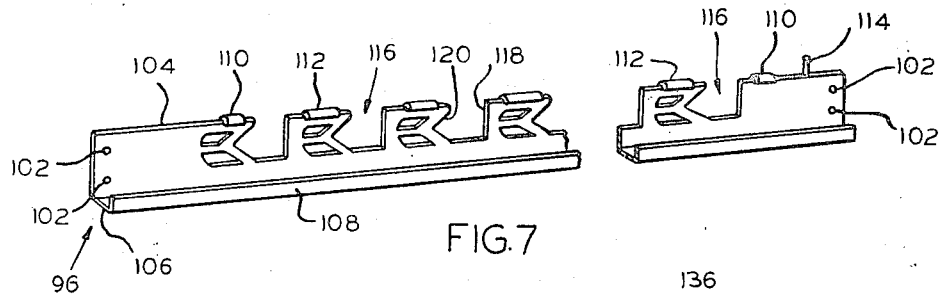
FIG.7
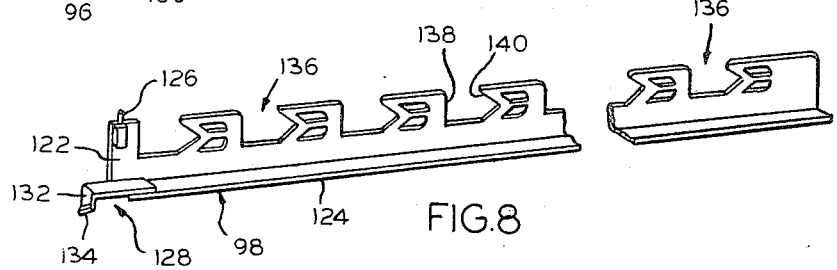
FIG.8

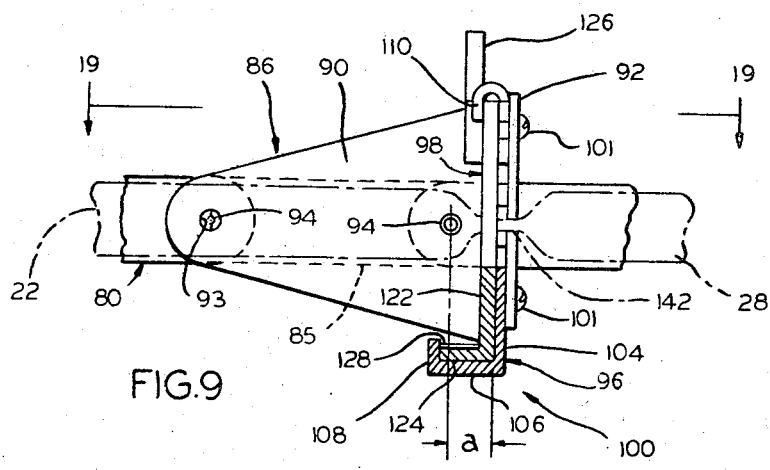
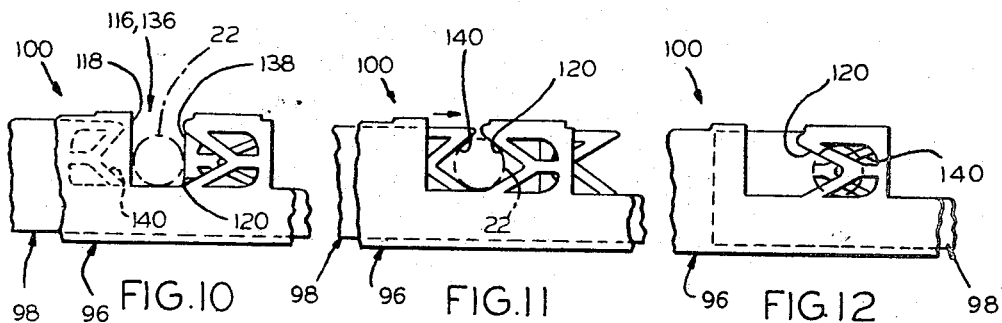
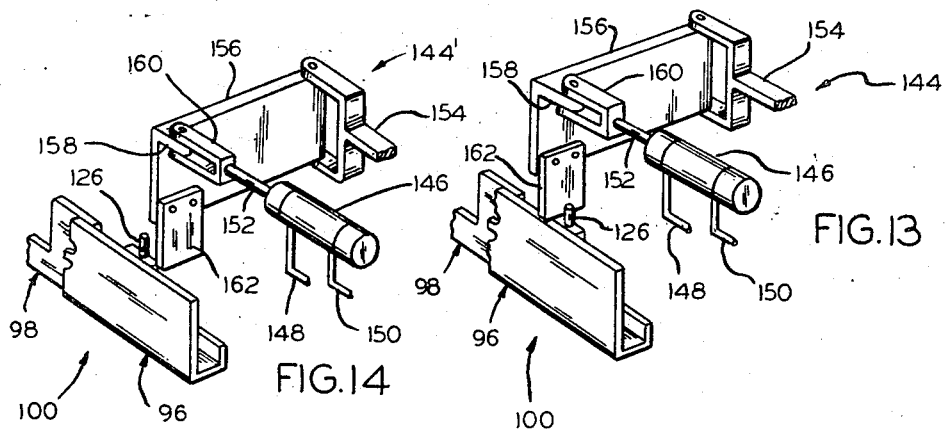

INVENTORS
THOMAS H. BUSH
RICHARD P. NELSON
BY Carl C. Batz
ATTORNEY

United States Patent Office 3,487,500
Patented Jan. 6, 1970

3,487,500
APPARATUS FOR LINKING SAUSAGE STRANDS
Thomas H. Bush, Chicago, Ill., and Richard P. Nelson, Kansas City, Mo., assignors to Armour and Company, Chicago, Ill., a corporation of Delaware
Filed Aug. 3, 1967, Ser. No. 658,255
Int. Cl. A22c 11/00, 13/00
U.S. Cl. 17—34                                    5 Claims

ABSTRACT OF THE DISCLOSURE

An apparatus for linking sausage strands, the apparatus including a linking conveyor having a pair of spaced parallel link chains and a plurality of equidistantly spaced parallel linking bars extending between said chains and fixedly mounted at opposite ends thereof on inconsecutive chain links for carrying a plurality of sausage strands on the bars and dividing the strands into links of equal length. Means mounting and linking bars are provided for carrying said strands on the bars with the strand axes in a common plane with the chain pivotal axes when the chains are in a straight position and for supporting the bars outwardly from the articulation axis beyond the pivotal axes of the links on which they are mounted when the chains are in an articulated position for maintaining substantially constant distances between the ends of the strand links during straight and articulated travel of the chains.

---

This invention relates to apparatus for linking sausage strands. More particularly, the invention relates to sausage strand linking apparatus including a linking conveyor having spaced parallel link chains and spaced parallel linking bars extending between the chains and mounted thereon for carrying a plurality of sausage strands on the bars and dividing the strands into links.

Sausage products such as frankfurters are produced by stuffing a comminuted meat mixture into long lengths of a suitable casing such as tubular cellulose film. The resulting strands subsequently are linked or divided into sections, smoked, cooked, and cooled. Previously, linking apparatus has been provided for dividing sausage strands into links and conveying the continuous linked strands through processing apparatus including smoking, cooking, and cooling chambers. Such apparatus is described in U.S. Patent No. 3,059,272.

Sausage strands have a tendency to break in automatic linking apparatus, especially due to the tensions placed on the strands during operation. In particular, the strands are susceptible to breakage between links when they are placed under tension in changing direction and in processing. Also, there is need for linking apparatus that is lighter, less expensive, and more easily cleaned.

An important object of the present invention is to provide sausage strand linking apparatus that minimizes the breakage problem. Another important object is to provide apparatus fulfilling the need for lighter, less expensive, and more easily cleaned apparatus, in particular, linking bar apparatus.

These and other objects, advantages, and functions of the invention will be apparent on reference to the specification and to the attached drawings illustrating a preferred embodiment of the invention, wherein like parts are identified by like reference symbols in each of the views, and wherein:

FIGURE 1 is a diagrammatic elevational view, with portions broken away, of apparatus for feeding, linking, conveying, and processing sausage strands automatically, which embodies the sausage linking apparatus of the invention;

FIG. 2 is an enlarged broken plan view of the feeding, linking and conveying apparatus of FIG. 1, taken substantially on lines 2—2 thereof;

FIG. 3 is a broken cross sectional view of the apparatus of FIG. 2, taken substantially on lines 3—3 thereof;

FIG. 4 is a further enlarged cross sectional view of a feed conveyor and a sausage strand thereon, taken on line 4—4 of FIG. 3;

FIG. 5 is a side elevational view of a feed conveyor belt section, taken on line 5—5 of FIG. 4;

FIG. 6 is an enlarged broken vertical transverse sectional view of the apparatus of FIG. 2, taken on line 6—6 thereof, particularly illustrating a linking conveyor including a linking bar assembly;

FIGS. 7 and 8 are broken perspective views of the linking bars in the assembly of FIG. 6, viewed from the opposite side thereof;

FIG. 9 is a further enlarged cross sectional view of the linking bar assembly, taken on line 9—9 of FIG. 6, showing a linked sausage strand in phantom lines;

FIGS. 10–12 are enlarged fragmentary views of the linking bar assembly as viewed in FIG. 6, illustrating its closing sequence in performing the linking operation;

FIGS. 13 and 14 are enlarged fragmentary perspective views of the linking bar assembly and of like apparatus for closing the assembly to perform the linking operation and for opening the assembly after processing, respectively;

Figure 15:
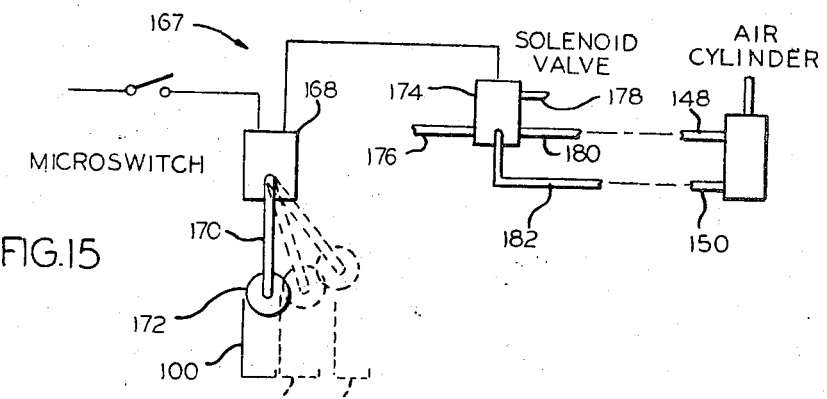
FIG. 15 is a diagrammatic view of apparatus which is employed in one location for actuating the linking bar assembly closing apparatus and in another location for actuating the linking bar assembly opening apparatus.

The invention provides improvements in apparatus for linking sausage strands including a linking conveyor having a pair of spaced parallel link chains and a plurality of equidistantly spaced parallel linking bars extending between the chains and fixedly mounted at opposite ends thereof on inconsecutive chain links for carrying a plurality of sausage strands on the bars and dividing the strands into links of equal length. Strand breakage is minimized by providing means mounting the linking bars for carrying the strands on the bars with the strand axes in a common plane with the straight chain pivotal axes and for supporting the bars outwardly beyond the pivotal axes of the links on which they are mounted for maintaining substantially constant distances between the ends of the strand links during straight and articulated travel of the chains. Linking bars assemblies of improved construction are provided which include two nesting angle bars movable longitudinally relative to each other, and guides on at least one of the bars and securing them against relative lateral displacement, each of the bars having a plurality of strand-receiving and constricting recesses therealong arranged for registry with the recesses in the remaining bar, whereby strands received in registering recesses in the assemblies are constricted between the bars to divide the strands into links upon moving the bars relative to each other.

Referring to FIG. 1 of the drawings, the apparatus illustrated includes supply apparatus 10 for force feeding round flexible strands in a given direction and alignment, sausage strand linking apparatus 12, and a processing unit 14 supplied with linked strands by the linking apparatus. The supply apparatus is particularly described in patent application Ser. No. 658,257, filed Aug. 3, 1967, of Grover B. Pennington and Richard P. Nelson for Apparatus for Force Feeding Round Flexible Strands. The processing unit, which per se is not part of the present invention, includes smoke circulation and hot air circulation units, as indicated on the drawings, associated with smoking and cooking chambers, and a chill tank, also indicated in the drawings. The strands after being linked are conveyed through the processing unit in a vertical serpentine fashion, where they are successively smoked, cooked, and chilled. After leaving the chill tank, the processed linked strands are discharged from the linking apparatus for finishing operations. The linking apparatus returns to its starting point via a cleaning station incorporated in the processing unit, as indicated on the drawings.

Referring to FIGS. 2 and 3, the apparatus illustrated therein includes a bank of twelve open top strand holders 20 each holding a long vertically folded sausage strand 22, a feeder assembly 24, and a linking conveyor 26. The feeder assembly and the linking conveyor are bounded on one side by side plates 25 and 25a, and on the other side by side plates 27 and 27a. The sausage strands are removed from the holders by the feeder assembly, and the feeder assembly force feeds the strands in parallel to the linking conveyor. The linking conveyor divides the strands into successive sausage links 28, and conveys the links to the smoking, cooking and chilling stations in the processing unit 14.

The feeder assembly 24 includes a transverse horizontal bumper rod 30, a transverse horizontal mounting rod 32, a row of twelve spaced guide rollers 34 on the mounting rod, a transverse horizontal forwardly inclined guide bar 36 having a row of twelve spaced circular guide holes 38 therein, and a group of twelve spaced parallel feed conveyors 40 in transverse alignment. The sausage strands 22 are removed from the holders 20 and are conducted individually over the guide rollers 34 and through the guide holes 38 to the feed conveyors 40, from whence they are fed to the linking conveyor 26.

The bumper rod 30 is mounted on the side plates 25 and 27 in spaced relation above the holders 20, and it insures that the strands are properly supplied to the guide rollers 34. The mounting rod 32 is mounted on the side plates in spaced relation above the bumper rod. The guide rollers are rotatably mounted on the mounting rod in vertical alignment with respective holders. The guide rollers are grooved to provide an arcuate concave surface on each conforming generally to the contour of a strand. The guide bar 36 is mounted on arms 42 secured to a transverse horizontal support rod 44 mounted on the side plates. The guide bar is mounted behind and slightly upwardly from the guide rollers. The guide holes 38 are longitudinally aligned with respective guide rollers, and the holes have diameters slightly greater than the diameter of the strands 22.

The feed conveyors 40 are mounted on the support rod 44 and on a transverse horizontal drive shaft 46 mounted on the side plates. The feed conveyors are longitudinally aligned with respective guide holes 38 and guide rollers 34, and are inclined slightly, upwardly and rearwardly from the guide bar. In the illustrative embodiment the guide rollers, the guide holes, and the feed conveyors are spaced apart transversely on three-inch centers, for feeding the strands 22 in spaced parallel longitudinally extending relation on like centers. The strands are fed along substantially straight paths to the linking conveyor 26.

The feed conveyors 40 include drive sprockets 48 mounted in spaced relation along the drive shaft 46, there being one such sprocket for each conveyor. Longitudinally extending mounting bars 50 are mounted on the drive shaft and the support rod 44, one for each conveyor. Each conveyor includes a grooved idler roller 52 having a flat groove 54 therein (see FIG. 4). The rollers are mounted on the forward ends of the mounting bars. A pressure roller 60 is mounted on each mounting bar 50 thereabove about midway between its ends. Each pressure roller has a peripheral groove therein, resulting in an arcuate surface conforming generally to the contour of a strand 22. The idler roller 52, the pressure roller 60 and the sprocket 48 in each feed conveyor are mounted in longitudinal alignment.

Each feed conveyor 40 includes a conveyor belt 66 (Ty-Linker belt) trained over the sprocket 48 and the idler roller 52 beneath the pressure roller 60. As seen in FIGS. 4 and 5, the belt includes and endless link chain 68 having elongated link pins 70 extending from opposite sides thereof. Carrying elements 72 bridge the chain and are mounted on the extending portions of the pins 70. Two adjacent pins are received in a pair of openings 74 on each side of each element. The elements are constructed of rubber or other suitable material, and each is provided with an arcuate concave carrying surface 76 conforming generally to the contour of a strand 22. The concave surfaces of the carrying elements provide a discontinuous carrying surface on the belt.

The conveyor belt chain 68 is drivingly engaged by the sprocket 48, and the belt is received in the groove 54 of the idler roller 52. The conveyor belt is driven on approximately 9 inch centers. The pressure roller 60 is aligned with the conveyor belt thereabove for feeding a strand 22 cooperatively therebetween, advancing the strand longitudinally on the upper surface of the belt.

Referring to FIGS. 2, 3, and 6–9, the linking conveyor 26 includes a pair of spaced parallel longitudinally extending conveyor chains 80 and a plurality of spaced parallel transversely extending linking bar assemblies 100 mounted on the conveyor chains. The sausage strands 22 are supplied by the feed conveyors 40 to the linking bar assemblies. The strands are formed into the links 28 by the linking bar assemblies and conducted thereon to the processing apparatus.

The conveyor chains 80 are endless link chains, and they are trained over a series of sprockets including a pair of forward drive sprockets 82 mounted on a shaft 84 and a pair of rear sprockets 81 mounted on a shaft 83. In the illustrative embodiment, 2½ inch extended pitch chains are employed. The chains travel in horizontal straight upper runs in the conveyor sections illustrated.

Each linking bar assembly 100 includes a fixed linking bar 96, a movable linking bar 98, and a pair of mounting brackets 86 secured to opposite ends of the fixed linking bar. The linking bar assemblies are mounted on the chains 80 by the mounting brackets, and the assemblies are mounted successively on inconsecutive chain links 85 entirely around the chains.

Figure 18:
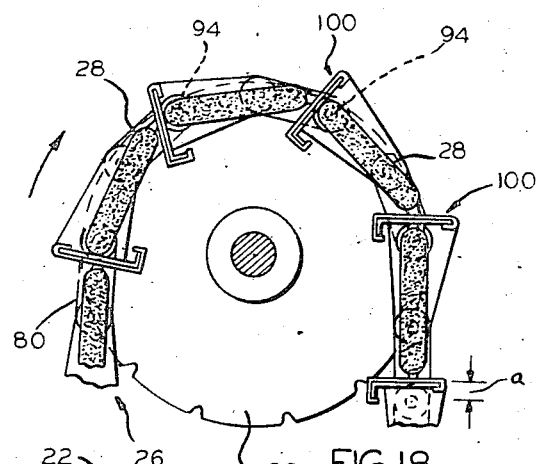
FIG. 18 is a diagrammatic view of the linking conveyor as it articulates over a sprocket.

As seen in FIGS. 6 and 9, the mounting brackets 86 are mounted on individual chain links 85, on the inner sides of the respective chains 80. Each bracket includes a triangular side portion 90 and a rectangular end portion 92 perpendicular to the side portion. The side portion of each bracket is provided with a pair of mounting holes 93 which receive the link pins 94 for mounting the bracket 86 on the link pins 94. The end portion of each bracket as mounted extends transversely inwardly of the conveyor and is spaced radially outwardly from any articulation axis beyond the pivotal axes of the link on which the bracket is mounted when the chains are in an articulated position (FIGURE 18).

The fixed linking bar 96 is an angle bar having perpendicular sides 104 and 106. One side 104 is normal to the conveyor path and upright in the horizontal run of the conveyor, and the remaining side 106 is parallel to the path and horizontal in such run. Threaded holes 102 are provided in the upright side adjacent the ends of the bar, and the mounting brackets are fixed to the bar by screws 101 inserted through the end portions 92 of the brackets into the threaded holes.

A guide flange or lip 108 is integral with the outer edge of the horizontal side 106 of the fixed linking bar, and it extends perpendicularly upwardly from the side therealong. End and intermediate guide flanges 110 and 112 are integral with the outer or upper edge of the upright side 104 of the fixed linking bar, and they extend upwardly and are reversely bent downwardly over the side in spaced relation thereto. A holding pin 114 is secured on the outside of the upright side and projects upwardly therefrom adjacent to and spaced from one end of the bar.

A plurality of spaced apart strand-receiving recesses 116 are provided in the upright side 104 along its outer or upper margin between successive guides 110 and 112, and the recesses open upwardly. One side 118 of each recess, nearer one end of the bar, is substantially vertical, and the opposite side 120 of each recess, nearer the opposite end of the bar, is generally V-shaped extending longitudinally of the bar, with the apex or pocket of the V-formation rounded.

The movable linking bar 98 is an angle bar having an upright side 122 and a horizontal side 124 perpendicular thereto, similarly to the fixed linking bar 96. An operating pin 126 is secured on the inside of the upright side and projects upwardly therefrom, at one end of the bar. A spring latch 128 is secured on the inside of the horizontal side at the same end of the bar. The latch extends outwardly from the end of the bar and is formed to provide a downturned hook portion 132 and an inclined outwardly flaring end 134.

The movable linking bar 98 is provided with a plurality of upwardly opening spaced strand-receiving recesses 136 in the upright side 122 along its outer or upper margin. The recesses are complementary to the recesses 116 in the fixed bar 96 and are arranged for registry therewith. The movable bar recesses include vertical sides 138 and opposite V-shaped sides 140 like the sides of the recesses on the fixed bar, except that the sides in the movable bar are transposed with reference to those on the fixed bar when the bars are assembled, as illustrated in FIG. 6.

As illustrated in FIGS. 6 and 9, the movable linking bar 98 is received in nesting relation on the fixed linking bar 96, with the horizontal side 124 of the former on the horizontal side 106 of the latter between the guide flange 108 and the upright side 104 thereof. The upright sides 104 and 122 of the bars are adjacent to each other, and the upper margin of the movable bar upright side 122 is received within the guide flanges 110 and 112 on the fixed bar. The operating pin 126 on the movable bar and the holding pin 114 on the fixed bar are at opposite ends of the resulting assembly. The movable bar is slidable on the fixed bar, longitudinally of the bars and transversely of the conveyor. The guide flanges on the fixed bar secure the linking bars against relative lateral displacement. While the illustrative structure is preferred, guide flanges may be provided on either or both of the linking bars.

In the linking bar assemblies 100, the apices of the V-shaped sides 120 and 140 of the bar recesses lie in a common plane with the axes of the bracket mounting holes 93 and thus in a common plane with the pivotal axes of the chain links 85 on which the brackets 86 are mounted, or the axes of the link pins 94. The upright sides 104 and 122 of the linking bars, more particularly the adjacent surfaces thereof, are supported by the brackets outwardly beyond the pivotal axes of the chain links. In the illustrative embodiment, the upright side 104 of the fixed bar 96 is approximately one-half inch beyond the axis of the nearest link pin 94, as represented by the distance a in FIGS. 9 and 18.

The movable linking bar 98 moves on the fixed linking bar 96 in the assembly 100 as illustrated in FIGS. 10–12. The linking bars initially are placed in the relative positions illustrated in FIG. 10. The recesses 116 and 136 on the respective bars are in register, so that a strand 22 may be received from above in each registering pair of recesses. As the movable bar 98 is moved on the fixed bar 96, the bars assume a relation as illustrated in FIG. 11, where the opposed V-shaped sides 120 and 140 on the respective bars approach each other with the strand 22 therebetween. Further movement of the movable bar brings the apices of the V-shaped sides almost together while moving the strand transversely, as illustrated in FIG. 12, constricting the strand at its intersection with the bars to a narrow neck 142 (FIG. 19) of about ⅛ inch diameter and thereby forming a link 28. This condition of the linking bar assembly also is illustrated in FIGS. 6 and 9.

Referring to FIGS. 2, 6, 13, 14 and 15, operating mechanism 144 is mounted on the side plate 25 near the front end of the conveyor 26, and like operating mechanism 144' is mounted on the side plate 25a near the rear end of the conveyor. Each mechanism includes a double-acting air cylinder 146 having air supply and vent lines 148 and 150 and a piston rod 152. A yoke member 154 extends inwardly from the side plate 25 or 25a, and an inner end of an operating lever 156 having an integral lug 158 at its outer end is pivotally mounted thereon. A bifurcated link 160 is secured to the outer end of the piston rod 152 and pivotally connected to the lug 158. An engagement bar 162 is vertically adjustably secured to the outer end of the lever 156 and depends therefrom. The operating lever is reciprocally operable by the air cylinder 146, to move the engagement bar 162 inwardly and outwardly over the conveyor 26. During the inward movement of the lever 156 on the mechanism 144 at the front end of the conveyor, the engagement bar engages the operating pin 126 on a movable linking bar 98, to move the movable bar in one direction on a fixed linking bar 96 and close the linking bar assembly 100, as described above and illustrated in FIGS. 10–12. During the outward movement of the lever 156 on the mechanism 144' at the rear end of the conveyor, the engagement bar engages the operating pin on the movable linking bar, to move the movable bar in the opposite direction on the fixed linking bar and open the linking bar assembly.

A rail 164 is mounted on an arm 166 extending over the conveyor 26 from the side plate 27 on the opposite side of the conveyor at its front end. The rail engages the holding pin 114 on the fixed linking bar 96, to prevent the fixed bar from moving when the movable bar 98 is moved by the operating mechanism 144.

Identical control mechanisms 167 (FIG. 15) are provided for actuating the operating mechanisms 144 and 144'. Microswitches 168 are mounted respectively on the side plates 27 and 27a at the front and rear ends of the conveyor 26, and they extend over the conveyor. Each switch includes a depending lever 170 and a roller 172 on the end of the lever. Each switch is electrically connected to a solenoid valve 174, in turn connected to a source of compressed air (not shown) and to an air cylinder 146. An air supply line 176 and a vent line 178 are connected to the valve. Air pressure and exhaust lines 180 and 182 are connected to the valve and to the air cylinder supply and vent lines 148 and 150.

The linking bar assemblies 100 contact the roller 172 of each microswitch 168 to operate the switch. As a linking bar assembly is conveyed from left to right, as viewed in FIG. 15, the switch roller is engaged by the assembly in the first position shown in full lines. As the assembly continues to move, the switch lever 170 is moved by the assembly to the second position illustrated in broken lines, to close the switch contacts and operate the solenoid valve 174. Compressed air then is supplied through the valve to the air cylinder 146, to retract or extend the piston rod 152, depending on which of the operating mechanisms 144 and 144' is being actuated. The movement of the piston rod causes the operating lever 156 to move inwardly or outwardly, as the case may be, engage the engagement bar 162 with the operating pin 126 on the movable linking bar 98, and close or open the linking bar assembly, while the assembly continues to move.

The foregoing operation continues as the microswitch roller 172 is moved into the third position illustrated in broken lines in FIG. 15. As the assembly 100 moves beneath the roller, the roller falls back over the assembly, passes through the second position, and returns to the first position. The switch contacts open at the second position, and the solenoid of valve 174 is de-energized. The air flow in the valve pressure and exhaust lines 180 and 182 is reversed, thereby extending or retracting the piston rod 152. The operating lever 156 is moved outwardly or inwardly into its initial position, completing the operating cycle.

In performing the linking operation at the front end of the conveyor, the control mechanism 167 actuates the operating mechanism 144 to retract the piston rod 152 and thereby close the linking bar assembly 100 and perform a strand linking operation. Prior to and during the closing movement of the movable linking bar 98, the latch 128 on the movable bar rides on the horizontal side 106 of the fixed linking bar 96. When the assembly is closed, the latch snaps over the adjacent end of the fixed bar horizontal side, thereby preventing relative longitudinal displacement of the bars during subsequent processing.

Figure 16:
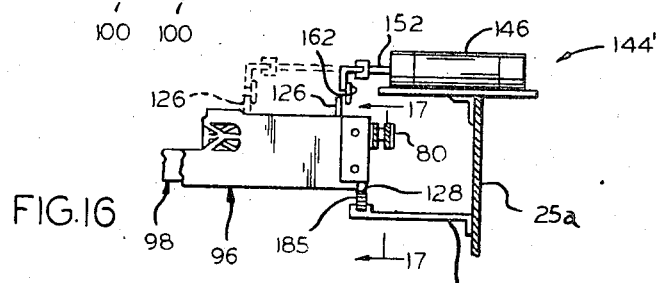
FIG. 16 is an enlarged fragmentary transverse sectional view of the apparatus of FIG. 2, taken substantially on line 16—16 thereof.
Figure 17:
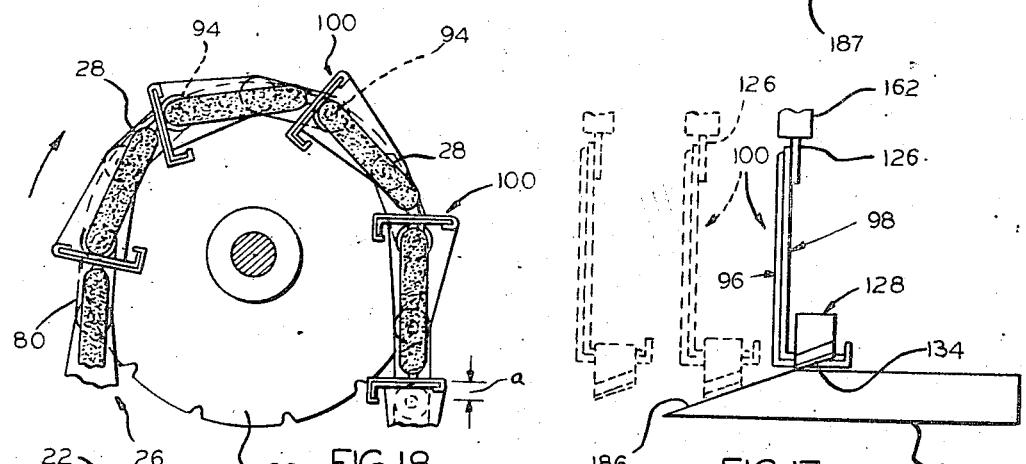
FIG. 17 is a diagrammatic view of the linking bar assembly in successive positions and a cooperative cam member, illustrating the manner in which the assembly is opened.

In discharging the processed linked strands at the rear end of the conveyor, the control mechanism 167 actuates the operating mechanism 144' to extend the piston rod 152 and thereby open each linking bar assembly 100. Prior to operation of the control mechanism, the latch 128 is raised to allow the movable linking bar 98 to move on the fixed linking bar 96, in the manner illustrated in FIGS. 16 and 17. A cam member 185 having an inclined surface 186 is mounted on an arm 187 secured to the side plate 25a. As the linking bar assembly approaches the operating mechanism, the inclined flaring end 134 of the latch engages the inclined cam surface, and the latch is raised thereby. The engagement bar 162 then engages the operating pin 126 on the movable linking bar and moves the movable bar in the manner illustrated in broken lines in FIG. 16, from the position of FIG. 12 to that of FIG. 10, whereupon the strands may be removed from the recesses 116, 136.

The sausage strands 22 are fed to the linking conveyor 26 continuously by the feeder assembly 24, and the strands are received continuously in the several recesses 116, 136 along successive linking bar assemblies 100 as they enter the upper run of the conveyor. The strands advance continuously with the assemblies. As each assembly reaches the linking station adjacent the operating mechanism 144, the assembly is closed by the operating mechanism to link or subdivide the strands. A succession of sausage links 28 is formed in each strand in this manner, between successive pairs of linking bar assemblies.

The above-described disposition of the apices of the V-shaped sides 120 and 140 of the linking bar recesses, in common planes with the pivotal axes of the chain links, results in the sausage links 28 being conveyed with their longitudinal axes in a common plane with the straight chain pivotal axes. With the upright sides 104 and 122 of the linking bars also supported outwardly beyond the pivotal axes of the chain links on which they are mounted, as described above, substantially constant distances are maintained between the ends of the sausage links during straight and articulated travel of the conveyor chains.

FIG. 18 illustrates articulated travel of the linking conveyor 26 over a processing unit sprocket 188 such as illustrated in FIG. 1. The straight line distance between alternate link pins 94 reduces as the cord when going from straight to articulated travel in a circular path around the sprocket. This reduction is compensated for by mounting the linking bars of the assemblies 100 outwardly from the link pin axes or the other end of a supported sausage the predetermined distance $a$ as shown in FIGURE 18, to maintain the distance between successive assemblies constant at the normal length of a sausage link 28. With the axes of the sausage links in a common plane with the straight chain pivotal axes, the same result obtains whether making an outside turn around a sprocket, as illustrated in FIG. 18, or making an inside turn around a sprocket. In this manner, undue compression or tension in the sausage links is avoided when the conveyor chains articulate over the sprockets, as the conveyor travels to succeeding processing stations. The specific distance $a$ of the linking bars from the axes of the adjacent link pins 94 for sausage links of a given length depends upon the size of the sprockets over which they travel. The spacing will be greater for smaller sprockets and less for larger sprockets.

Referring to FIG. 2, with the linking bar assemblies 100 spaced on 5 inch centers, the product links 28 are 4⅞ inches long. In producing the links of this size, employing the illustrative apparatus, a greater length of strand 22 is supplied initially between the assembly 100a preceding the linking station and the assembly 100b at the linking station. The additional length of strand minimizes strand breakage at the linking station due to stretching.

Figure 19:
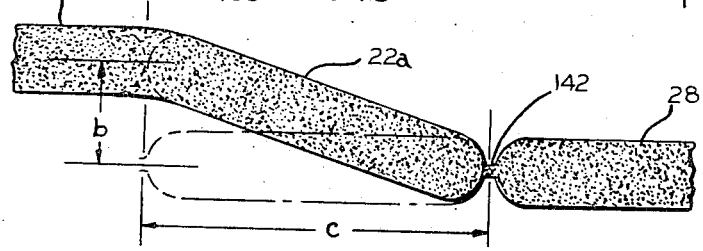
FIG. 19 is an enlarged fragmentary plan view of a sausage strand, as viewed on line 19—19 of FIG. 9, illustrating its configuration adjacent to the linking station.

Thus, the strand 22 initially is fed to the registering recesses 116, 136 in the linking bars as illustrated in FIG. 10. When the movable bar 98 at the linking station is moved to the linking position illustrated in FIG. 12, the strand 22 is moved transversely at this point. The resulting configuration of the strand adjacent to the linking station is illustrated in FIG. 19. In this view, the transverse movement of the strand at the movable bar is represented by the distance $b$. The strand portion 22a between the successive assemblies 100a and 100b is the hypotenuse of a triangle having one side of length $b$ and the other side of a length $c$ equal to the perpendicular distance between successive assemblies. The length of the strand portion 22a is the square root of the sum of $b^2$ and $c^2$. The difference between this value and $c$ represents the excess amount of strand supplied to link the strand without stretching and possibly breaking it at the neck 142.

When the links 28 are completely formed between successive assemblies 100 in this manner, they include excess strand length and are under compression. The excess amount of strand becomes advantageous in subsequent processing operations, inasmuch as shrinkage takes place and is compensated for by the excess, eliminating breakage which otherwise is experienced.

The feeder assembly 24 removes the strands 22 from the holders 20 and supplies them to the linking conveyor 26 in alignment with the registering linking bar recesses 116 and 136, as illustrated in FIGS. 2 and 10. The strands are fed to the linking conveyor at a slightly greater rate of longitudinal or horizontal travel than the rate of travel of the linking conveyor, to satisfy the above-described requirement for additional length of the strand portions 22a. For this purpose, the linking conveyor drive mechanism is coupled with the feed conveyor drive mechanism for driving the feed conveyor belts 66 synchronously with the linking conveyor at the aforesaid greater rate of travel.

The shaft 84 on which the forward drive sprockets 82 for the linking conveyor 26 are mounted is provided with an outer additional sprocket 190 on one side of the apparatus, adjacent to one side plate 25. The latter sprocket is coupled with an outer sprocket 192 on the feed conveyor drive shaft 46 by a link chain 194 trained on the sprockets. The feed conveyor drive shaft, the belt drive sprockets 48 thereon (FIG. 3), and the conveyor belts 66 driven thereby thus are driven synchronously with the linking conveyor 26 by the drive mechanism for the linking conveyor, including the forward shaft 84 thereof and a drive motor, not illustrated, coupled therewith. The sizes of the sprockets 48 and 192 on the feed conveyor drive shaft 46 and the sprocket 190 on the linking conveyor shaft 84 are such as to drive the feed conveyor belts 66 at a greater rate of longitudinal travel than the linking conveyor.

In operation, strands 22, which may be 160 foot lengths, are threaded over the guide rollers 34, through the holes 38 in the guide bar 36, between the feed conveyor belts 66 and the pressure rollers 60, and through the registering recesses 116, 136 of the first linking bar assembly 100a. The linking conveyor 26 is placed in operation, thereby also placing the feed conveyor 40 in operation, and thereafter, the operations are automatic. The strands unfold from the holders 20, are guided to the conveyor belts 66, and are conveyed thereon at a slight upward inclination and horizontally in the same direction as the path of the linking conveyor 26. The strands are aligned with the recesses 116, 136 in the linking bars, and as each linking bar assembly 100 approaches from below in its travel around the forward drive sprockets 82, the recesses thereof receive the strands. The strands are linked by the action of the operating mechanism 144 on the movable linking bars 98.

Should a strand break at the linking station, despite the above-described supply of excess strand length thereto, the feed conveyor 40 continues to feed the strand. The broken strand does not fall back into the holder 20, as would occur in the absence of the feed conveyor. If desired, the severed link or links may be removed, and for this purpose, the conveyors may be stopped temporarily.

After being linked, the strands are carried by the linking conveyor 26 through the processing unit 14. The linking bar assemblies 100 are opened at the rear of the apparatus by the action of the operating mechanism 144', and the product is removed. Thereafter, the linking bar assemblies are conveyed to the front end of the apparatus, and the cycle of operation is repeated.

While a preferred embodiment of the invention has been described and illustrated, it will be apparent that various changes and modifications may be made therein within the spirit and scope of the invention.

We claim:
1. In apparatus for linking sausage strands, a linking conveyor comprising a pair of spaced parallel link chains, a plurality of linking bar assemblies each including a fixed linking bar and a linking bar movable on said fixed bar for cooperatively carrying and linking a plurality of sausage strands, and supporting means fixedly mounting opposite ends of each of said linking bar assemblies on respective chains, said assemblies being mounted successively on inconsecutive links of said chains with said bars of successive assemblies parallel to each other and equidistantly spaced apart for carrying said strands on a plurality of assemblies with the strand axes in a common plane with the chain pivotal axes when the chains are in a straight position and for dividing said strands into links of equal length, and said supporting means supporting said bars of successive assemblies radially outwardly from any articulation axis beyond the pivotal axes of the links on which they are mounted when said chains are in an articulated position for maintaining substantially constant distances between the ends of the strand links during straight and articulated travel of the chains.

2. Apparatus as defined in claim 1 wherein each of said linking bars has a plurality of strand-receiving recesses therealong arranged for registry with the recesses in the cooperating bar in each assembly, said recesses each having a V-shaped side extending longitudinally of the bar and such sides facing in opposite directions on the respective bars in each assembly, whereby strands received in registering recesses in each assembly are constricted between said oppositely facing sides on the respective bars to divide the strands into links upon moving said movable bar on said fixed bar.

3. Apparatus as defined in claim 1 wherein said assemblies are mounted on alternate links of said chains.

4. Apparatus as defined in claim 2 wherein said fixed linking bar and said movable linking bar comprise two nesting angle bars having integral guides securing them against relative lateral displacement.

5. In apparatus for linking sausage strands including a linking conveyor having a pair of spaced parallel link chains and a plurality of equidistantly spaced parallel linking bars extending between said chains and fixedly mounted at opposite ends thereof on inconsecutive chain links for carrying a plurality of sausage strands on the bars and dividing the strands into links of equal length, means mounting said linking bars for carrying said strands on the bars with the strand axes in a common plane with the chain pivotal axes when the chains are in a straight position and for supporting the bars radially outwardly from any articulation axis beyond the pivotal axes of the links on which they are mounted when the chains are in an articulated position for maintaining substantially constant distances between the ends of the strand links during straight and articulated travel of the chains.

References Cited

UNITED STATES PATENTS

| 2,492,222 | 12/1949 | Jacobson | 17—34 |
| 2,675,753 | 4/1954 | Eber | 17—34 X |
| 3,059,272 | 10/1962 | Millenaar | 17—34 |
| 3,276,352 | 10/1966 | Allen et al. | |

LUCIE H. LAUDENSLAGER, Primary Examiner

U.S. Cl. X.R.

17—49